United States Patent
Fan et al.

(10) Patent No.: US 11,121,800 B2
(45) Date of Patent: Sep. 14, 2021

(54) METHOD AND APPARATUS FOR LINK ADAPTATION IN A MIXED TRAFFIC ENVIRONMENT

(71) Applicant: Telefonaktiebolaget LM Ericsson (publ), Stockholm (SE)

(72) Inventors: Rui Fan, Beijing (CN); Jinhua Liu, Beijing (CN); Hai Wang, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 20 days.

(21) Appl. No.: 16/629,830

(22) PCT Filed: Jul. 14, 2017

(86) PCT No.: PCT/CN2017/092947
§ 371 (c)(1),
(2) Date: Jan. 9, 2020

(87) PCT Pub. No.: WO2019/010697
PCT Pub. Date: Jan. 17, 2019

(65) Prior Publication Data
US 2021/0160000 A1    May 27, 2021

(51) Int. Cl.
*H04L 1/00* (2006.01)
*H04W 28/24* (2009.01)
(Continued)

(52) U.S. Cl.
CPC .......... *H04L 1/0017* (2013.01); *H04L 1/0003* (2013.01); *H04L 1/0009* (2013.01);
(Continued)

(58) Field of Classification Search
None
See application file for complete search history.

(56) References Cited

U.S. PATENT DOCUMENTS

| | | | |
|---|---|---|---|
| 10,021,686 B1 * | 7/2018 | Oroskar | ............... H04L 5/0055 |
| 2003/0161323 A1 | 8/2003 | Harada et al. | |

(Continued)

FOREIGN PATENT DOCUMENTS

| | | |
|---|---|---|
| CN | 102783209 A | 11/2012 |
| CN | 106254268 A | 12/2016 |

(Continued)

OTHER PUBLICATIONS

Supplementary European Search Report and Written Opinion dated Jan. 21, 2021 for International Application No. 17917357.0 filed on Jan. 23, 2020, consisting of 9-pages.

(Continued)

*Primary Examiner* — Ajit Patel
(74) *Attorney, Agent, or Firm* — Christopher & Weisberg, P.A.

(57) ABSTRACT

The present disclosure provides a method for performing link adaptation at a network node in a wireless communication network, which may include identifying first traffic and second traffic included in transmission between the network node and a user equipment, wherein the first traffic is related to first service having a first quality of service (QoS) requirement, and the second traffic is related to second service having a second QoS requirement; and applying a first link adaptation loop catering for the first QoS requirement to the first traffic, and applying a second link adaptation loop catering for the second QoS requirement to the second traffic. In one example, the second link adaptation loop is independent from the first link adaptation loop. In another example, the second link adaptation loop is dependent on the first link adaptation loop.

19 Claims, 6 Drawing Sheets

(51) Int. Cl.
  *H04L 1/16* (2006.01)
  *H04L 1/18* (2006.01)
  *H04W 28/16* (2009.01)
  *H04W 84/04* (2009.01)

(52) U.S. Cl.
  CPC .......... *H04L 1/0016* (2013.01); *H04L 1/1614* (2013.01); *H04L 1/1812* (2013.01); *H04W 28/16* (2013.01); *H04W 84/042* (2013.01)

(56) References Cited

U.S. PATENT DOCUMENTS

| | | |
|---|---|---|
| 2005/0159166 A1 | 7/2005 | Jonsson et al. |
| 2010/0157831 A1* | 6/2010 | Takeuchi ................ H04L 27/36 370/252 |
| 2013/0182569 A1 | 7/2013 | Bertrand et al. |
| 2014/0003239 A1* | 1/2014 | Etemad ................ H04L 1/1887 370/235 |
| 2015/0003435 A1* | 1/2015 | Horn .................... H04W 28/24 370/338 |
| 2015/0312831 A1* | 10/2015 | Sang ..................... H04W 24/08 370/236 |
| 2017/0141903 A1* | 5/2017 | Xu ........................ H04L 1/1692 |
| 2018/0343205 A1* | 11/2018 | Lei ........................ H04L 1/1812 |
| 2019/0215133 A1* | 7/2019 | Pan .................... H04W 72/0446 |
| 2020/0187165 A1* | 6/2020 | Park ..................... H04L 1/1671 |

FOREIGN PATENT DOCUMENTS

| | | |
|---|---|---|
| CN | 106465194 A | 2/2017 |
| WO | 2007079058 A2 | 7/2007 |
| WO | 2017041207 A1 | 3/2017 |

OTHER PUBLICATIONS

International Search Report and Written Opinion of the International Searching Authority dated Mar. 27, 2018 issued in PCT Application No. PCT/CN2017/092947, consisting of 8 pages.
3GPP. 3rd Generation Partnership Project: Technical Specification Group Radio Access Network: Study on New Radio Access Technology: Radio Interface Protocol Aspects(Release 14) 3GPP TR 38.804 VO.51, Feb. 28, 2017 consisting of 47 pages.

* cited by examiner

METHOD AND APPARATUS FOR LINK ADAPTATION IN A MIXED TRAFFIC ENVIRONMENT

CROSS-REFERENCE TO RELATED APPLICATIONS

This application is a Submission Under 35 U.S.C. § 371 for U.S. National Stage Patent Application of International Application Number: PCT/CN2017/092947, filed Jul. 14, 2017 entitled "METHOD AND APPARATUS FOR LINK ADAPTATION IN A MIXED TRAFFIC ENVIRONMENT," the entirety of which is incorporated herein by reference.

TECHNICAL FIELD

The present disclosure generally relates to the technical field of wireless communication, and in particular to method and apparatus for performing link adaptation in a wireless communication network.

BACKGROUND

This section is intended to provide a background to the technologies described in this disclosure. Unless otherwise indicated herein, what is described in this section should not be regarded as prior art and are not admitted to be prior art by inclusion in this section.

Link adaptation is an important function in a wireless communication system. In a Long Term Evolution (LTE) system, the purpose of link adaptation is to determine a Modulation and Coding Scheme (MCS) that will maximize a transmitter's data rate under a given radio link condition. In a typical system that implements a retransmission scheme, e.g., a Hybrid Automatic Repeat Request (HARQ) scheme, the link adaptation process is designed to select the highest MCS with which a target Block Error Rate (BLER) can be achieved after a number of transmissions. Typically, the MCS is selected for each transport block, which is transmitted every Transmission Time Interval (TTI). The LTE system treats all the transmitted traffic in the same way as Internet Protocol (IP) data and follows the same protocol and algorithms at higher layers such as e.g. Transmission Control Protocol (TCP) or User Datagram Protocol (UDP) regardless of traffic type. It simplifies hardware implementation and maintenance for the LTE system.

The continuing evolution from LTE to 5G (the fifth generation of mobile telecommunication and wireless technology) opens up the possibility of introducing an entirely new air interface which is also referred to as New Radio (NR), and creating network architecture and designs that are not necessarily backward compatible with LTE. 5G is envisaged to expand and support diverse usage scenarios and applications. Accordingly, the NR needs to support multiple types of services which may likely have very different service requirements.

The conventional link adaptation scheme, e.g. those used in the LTE system, cannot meet the requirement for diverse usage scenarios and applications arising in the evolution from LTE to 5G, and in 5G network.

SUMMARY

It is therefore an object of the present disclosure to improve link adaptation, in particular, to provide some solutions for link adaptation to cope with a mixed traffic environment.

According to one aspect of the present disclosure, there is provided a method for performing link adaptation at a network node in a wireless communication network, which may comprise identifying first traffic and second traffic included in transmission between the network node and a user equipment (UE), wherein the first traffic is related to first service having a first quality of service (QoS) requirement, and the second traffic is related to second service having a second QoS requirement; and applying a first link adaptation loop catering for the first QoS requirement to the first traffic, and applying a second link adaptation loop catering for the second QoS requirement to the second traffic.

In one exemplary embodiment, the second link adaptation loop is independent from the first link adaptation loop.

In another exemplary embodiment, the second link adaptation loop is dependent on the first link adaptation loop.

According to another aspect of the present disclosure, there is provided a network node in a wireless communication network, which may comprise a communication interface configured to perform communication with a UE, a processor, and a memory containing instructions that when executed cause the processor to perform any of the methods in the present disclosure.

According to still another aspect of the present disclosure, there is provided a network node in a wireless communication network configured for performing link adaptation for traffic included in transmission between the network node and a UE. The network node may comprise a communication interface and a processing circuitry. Said processing circuitry may be configured to cause the network node to identify first traffic and second traffic included in transmission between the network node and a UE, wherein the first traffic is related to first service having a first QoS requirement, and the second traffic is related to second service having a second QoS requirement; and apply a first link adaptation loop catering for the first QoS requirement to the first traffic, and apply a second link adaptation loop catering for the second QoS requirement to the second traffic.

According to still another aspect of the present disclosure, there is provided a computer program comprising computer program code which, when executed in a network node, causes the network node to perform any of the methods in the present disclosure. According to another aspect of the present disclosure, there is provided a carrier containing said computer program.

According to still another aspect of the present disclosure, there is provided an apparatus for performing link adaptation in a wireless communication network, comprising modules for performing each step in any of the methods in the present disclosure.

The solutions as provided in the present disclosure can concurrently meet the different requirements of different services in the mixed traffic environment, by means of multiple link adaptation loops catering for different service requirements. Moreover, the solutions in the present disclosure can be flexibly adapted to various mixed traffic patterns, for example, where two traffic are multiplexed together, but one traffic is much sparser than another traffic.

Other embodiments and the further advantages thereof are discussed in details hereinafter.

BRIEF DESCRIPTION OF THE DRAWINGS

The above and other objects, features and advantages of the present disclosure will become clearer from the following detailed description about the non-limited embodiments of the present disclosure taken in conjunction with the accompanied drawings, in which.

DETAILED DESCRIPTION OF EMBODIMENTS

In the following description, numerous specific details are set forth in embodiments. It will be appreciated, however, by persons skilled in the art that the embodiments as disclosed herein may be practiced without such specific details, and that other changes may be made, without departing from the spirit or scope of the subject matters presented here. In other instances, well-known circuits, structures and techniques have not been shown in detail in order not to obscure the understanding of the present disclosure.

References to the phrases "one embodiment", "an embodiment", "an example embodiment" and the like throughout the disclosure indicate that the embodiment described may include a particular feature, structure, or characteristic, but every embodiment may not necessarily include the particular feature, structure, or characteristic. Moreover, such phrases are not necessarily referring to the same embodiment.

In the present disclosure, a link adaptation loop may refer to software (e.g. algorithm), hardware, combination of software and hardware, or functional module for performing link adaptation of uplink and/or downlink.

Hereinafter, some embodiments of the present disclosure are discussed in the context of 5G network and New Radio (NR). However, persons skilled in the art would understand these embodiments may be applicable to other networks such as LTE, "eLTE" proposed by 3GPP Release 15 and the like, or even applicable to coexistence of eLTE and NR.

Figure 6:
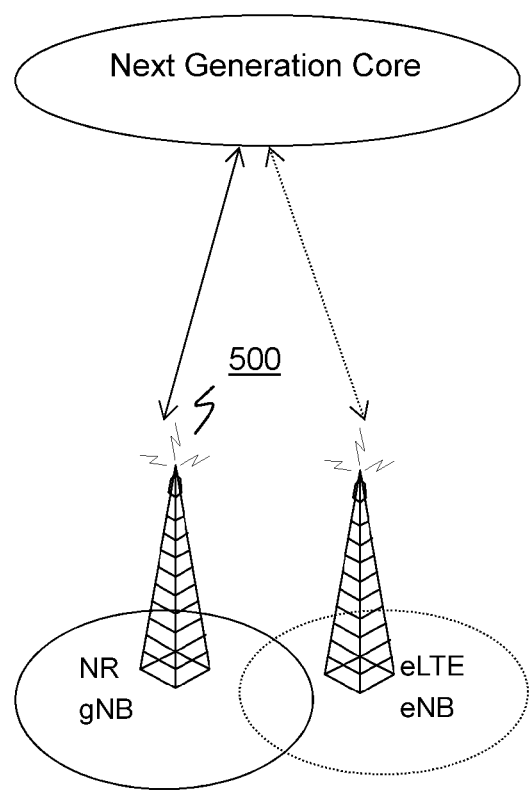
FIG. 6 schematically depicts an exemplary network in which some embodiments of the present disclosure can be implemented.

FIG. 6 schematically depicts an exemplary network 700 in which some embodiments of the present disclosure can be implemented.

According to one embodiment, the network 700 may be 5G wireless communication network which mainly comprises a core network being referred to as Next Generation Core, and one or more access point being referred to as NR base station (NR BS) or NR NodeB (gNB).

According to another embodiment, the network 700 may be based on combination of two or more of 3G, 4G, 4.5G and 5G network ("XG" refers to $X^{th}$ generation). In addition to the NR BS or the NR gNB, the network 700 may further comprise other types of wireless access points, for example, radio base station for 3G, NodeB (NB) for LTE, or enhanced NodeB (eNB) for eLTE. As an example, the gNB(s) for NR and the eNB(s) for eLTE may coexist and share the same core network, e.g. as shown in FIG. 6, in the earlier deployment stage during evolution from LTE to 5G. It should be noted that the connection from the eNB to the core network and the coverage of the eNB are shown by dotted lines in FIG. 6, which implies that the eNB(s) may be replaced with the gNB(s) in the future 5G network.

Evolving to 5G includes work on a New Radio (NR) Access Technology (RAT). A general description of the agreements on 5G New Radio (NR) Access Technology so far is contained in 3GPP TR 38.802 V14.0.0 (2017-03). The NR needs to support multiple types of services, such as enhanced Mobile Broadband (eMBB), massive Machine Type Communications (mMTC) and Ultra-Reliable and Low Latency Communications (URLLC). For eMBB service being characterized by higher spectral efficiency and higher user experience throughput, its quality of service (QoS) requirement is medium and usually a Block Error Rate (BLER) of 10% is good enough for initial transmission, and Radio Link Control (RLC) automatic repeat request (ARQ) or sometimes Packet Data Compression Protocol (PDCP) retransmission can be used to resolve residual Medium Access Control (MAC) transmission error. However, URLLC service requires instant network access with low latency and high reliability for use in mission critical communication. Thus, URLLC has very strict requirement on delay and reliability, with a target BLER of less than 1%, and RLC/PDCP retransmission is not allowed due to the tight delay budget. The mMTC service requires very high density of device deployment where each device may be generating intermittent short burst of data traffic.

The NR may support a mixed traffic environment where two or more traffic for different services are provided concurrently from a network node to a user equipment (UE). For example, the first traffic from eMBB service and the second traffic from URLLC service may be multiplexed on the same radio channel by dynamic resource sharing. It is to be noted that the term "concurrently" means the two or more traffic may be simultaneously transmitted in at least part of transmission duration, but not necessarily be the case in the whole of the transmission duration. It is possible the first traffic may be transmitted all the time while the second traffic may be rather sparse.

The conventional link adaptation scheme used in the LTE cannot cope with such a mixed traffic environment, because the scheme typically may treat all traffic in the same way by one link adaptation loop, and cannot meet the different QoS requirements of different services. For example, if the target BLER is set high as for eMBB service, then the selected Modulation and Coding Scheme (MCS) may be too high for URLLC service and may result in too many transmission errors. If the target BLER is set low as for URLLC service, then the selected MCS may be too low for eMBB service and may result in low spectrum efficiency.

Figure 1:
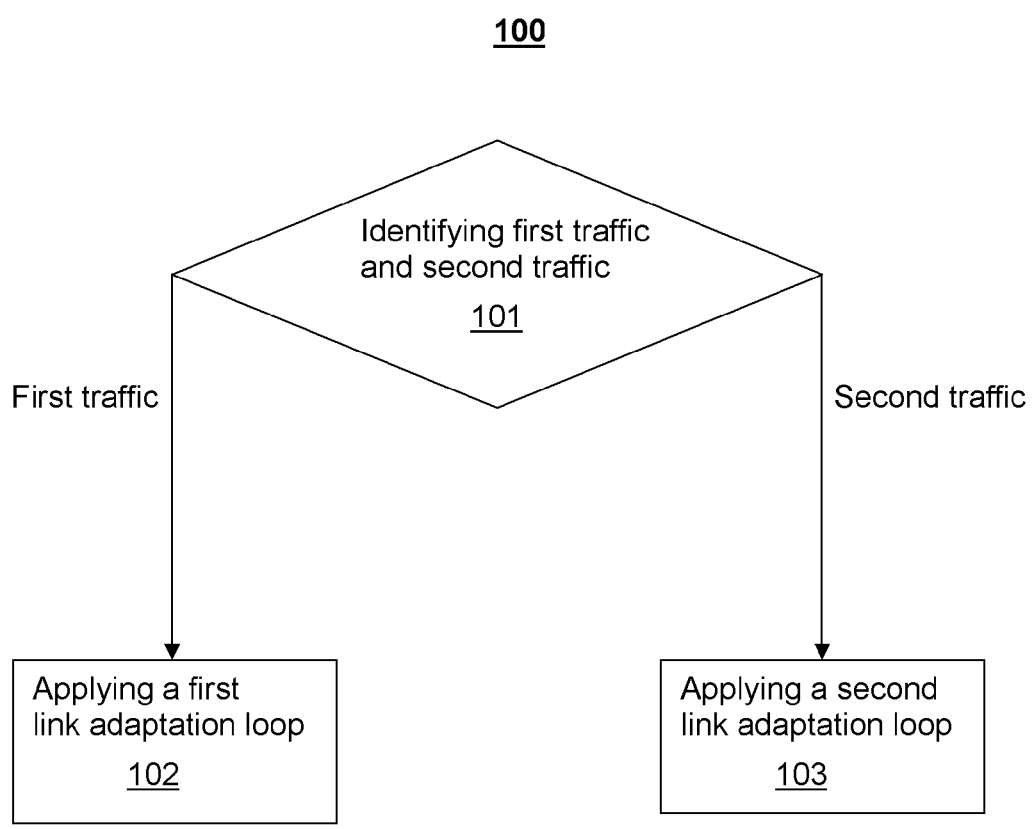
FIG. 1 is a flow diagram for illustrating a method for performing link adaptation according to some embodiments of the present disclosure.

FIG. 1 is a flow diagram for illustrating a method 100 for performing link adaptation at a network node in a wireless communication network, according to some embodiments of the present disclosure.

The method 100 may comprise: identifying first traffic and second traffic included in transmission between the network node and a user equipment (UE), wherein the first traffic is related to first service having a first quality of service (QoS) requirement, and the second traffic is related to second service having a second QoS requirement, at step 101; and applying a first link adaptation loop catering for the first QoS requirement to the first traffic at step 102, and applying a second link adaptation loop catering for the second QoS requirement to the second traffic at step 103.

Said QoS requirement may comprise a target Block Error Rate (BLER), allowable maximum delay, and/or other parameters related to service quality.

In an exemplary embodiment, the first service is eMBB service having target BLER of lower than 10%, and the second service is URLLC service having target BLER of lower than 1%. The method of the present disclosure enables two link adaptation loops to be used separately for eMBB and URLLC services, so that the different target BLER requirements for eMBB and URLLC services can be satisfied concurrently.

It is to be noted that although the method 100 is discussed in the context of two services, persons skilled in the art would understand that the inventive concept of this disclosure may be applicable to a situation having more than two services.

In one exemplary embodiment, said identifying of traffic at the step 101 may be based on logical channel identifier (ID) included in each transport block for the respective traffic. For example, from the transport block itself, the network can know whether a transport block is used to transmit eMBB traffic or URLLC traffic by checking the logical channel ID included in the transport block, because the eMBB traffic and the URLLC traffic should be mapped to different logical channels.

In another exemplary embodiment, said identifying of traffic at the step 101 may be based on different length of transmission time interval (TTI) or numerology for the respective traffic. The term "numerology" refers to basic physical layer parameters, such as those parameters regarding subframe structure, and may include transmission bandwidth, frame duration, subframe duration, slot duration, symbol duration, subcarrier spacing, sampling frequency, number of subcarrier, resource blocks (RBs) per subframe, symbols per subframe, cyclic prefix (CP) length and so on. Numerology in the NR may be defined by subcarrier spacing and CP overhead. The NR can support flexible/scalable numerology. Multiple subcarrier spacings can be derived by scaling a basic subcarrier spacing by an integer. For example, the subcarrier spacing may be selected as 15 kHz, 30 kHz, 60 kHz or 120 kHz, wherein larger subcarrier spacing may be used for higher frequencies to obtain robustness to higher phase noise. The CP length may be selected as 4.7 μs, 2.4 μs, 1.2 μs or 0.6 μs, wherein larger CP length may be used for lower frequencies. The support of multiple numerologies has been agreed for NR, which numerologies can be multiplexed in the frequency and/or time domain for the same or different UEs. Different numerologies may thus coexist on the same subcarrier. Each gNB for the NR may transmit different traffic using different numerologies which are time division multiplexed (TDM) or frequency division multiplexed (FDM). Hence, traffic may be identified based on the numerology for the respective traffic.

In an exemplary embodiment, the step 102 and the step 103 may be performed simultaneously or alternatively in time domain, depending on occurrence or not of the first traffic or the second traffic in the transmission. For example, the first traffic may be constantly transmitted so that the step 102 may be performed at every TTI, while the second traffic may be rather sparse, so that the step 103 may be performed at intervals of e.g. ten TTIs.

Figure 2:
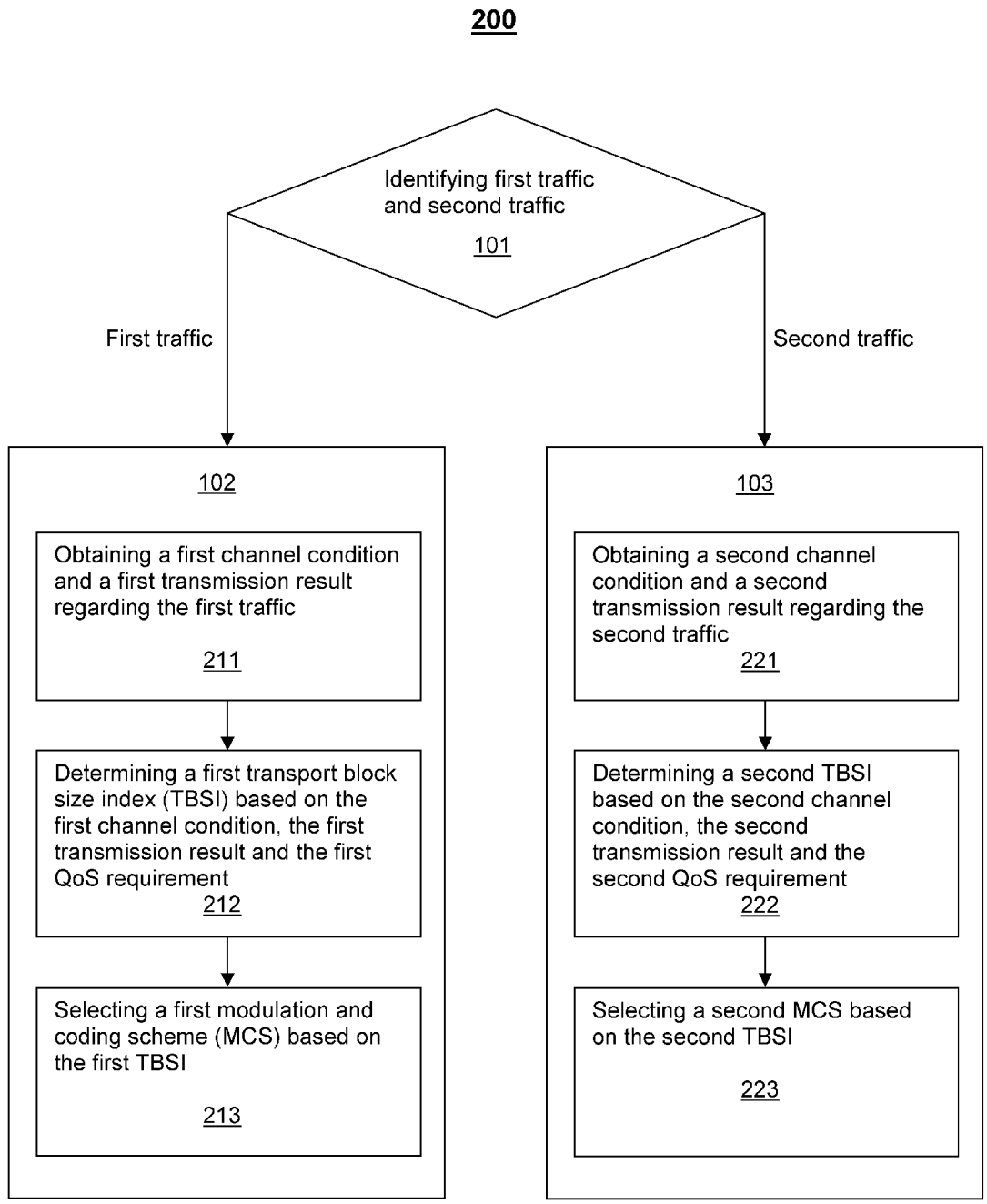
FIG. 2 is a flow diagram for illustrating a method for performing link adaptation according to one embodiment of the present disclosure.

FIG. 2 is a flow diagram for illustrating a method 200 for performing link adaptation according to one embodiment of the present disclosure.

The method 200 may be performed at a network node in a wireless communication network, and may comprise: identifying first traffic and second traffic at step 101; and applying a first link adaptation loop to the first traffic at step 102, and applying a second link adaptation loop to the second traffic at step 103, wherein the steps 101, 102 and 103 of the method 200 may be similar as those steps of the method 100 as discussed above. According to the method 200, the second link adaptation loop is independent from the first link adaptation loop.

In an exemplary embodiment, said step 102 of applying the first link adaptation loop may comprise: obtaining a first channel condition and a first transmission result regarding the first traffic, at step 211; determining a first transport block size index (TBSI) based on the first channel condition, the first transmission result and the first QoS requirement, at step 212; and selecting a first MCS based on the first TBSI, at step 213. Moreover, said step 103 of applying the second link adaptation loop may comprise: obtaining a second channel condition and a second transmission result regarding the second traffic, at step 221; determining a second TBSI based on the second channel condition, the second transmission result and the second QoS requirement, at step 222; and selecting a second MCS based on the second TBSI, at step 223.

For downlink transmission, said channel condition may comprise channel quality indicator (CQI) reported by the UE, and said transmission result may comprise Hybrid Automatic Repeat Request (HARQ) feedback from the UE, for example, acknowledgement (ACK) or non-acknowledgement (NACK). For uplink transmission, said channel condition may comprise signal to interference noise ratio (SINR) measured at the network node, and said transmission result may comprise decoding result at the network node. Other parameters for the channel condition or the transmission result may be also feasible for some methods in the present disclosure.

In one exemplary embodiment, for downlink transmission, the first or second TBSI may be determined (at step 212 or at step 222) by mapping a respective CQI to a mapped TBSI, and adjusting the mapped TBSI based on a respective HARQ feedback and a respective target BLER. As a non-limiting example, an adjustment variable for adjusting the mapped TBSI may be decreased by a step $TBS_{adjust\_step}$ upon receipt of NACK and increased by $TBSI_{adjust\_step}/(1/BLER_{tgt}-1)$ upon receipt of ACK, wherein $BLER_{tgt}$ is the target BLER of the respective service.

Moreover, the adjusted TBSI should be limited within the scope of 0 to 26. The mapping between MCS Index and transport block size index (TBSI or TBS Index) is defined in $3^{rd}$ Generation Partnership Project Technical Specification (3GPP TS) 36.213, e.g. Table 7.1.7.1-1, which is incorporated herein by reference.

TABLE 7.1.7.1-1

Modulation and TBS index table for PDSCH

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |

TABLE 7.1.7.1-1-continued

Modulation and TBS index table for PDSCH

| MCS Index $I_{MCS}$ | Modulation Order $Q_m$ | TBS Index $I_{TBS}$ |
| --- | --- | --- |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

In an exemplary implementation, the network node shall also consider buffer status at network side for downlink adaptation, or buffer status at UE side for uplink adaptation, during determination of TBSI. For example, a smaller TBSI may be determined by comparison between the adjusted TBSI, and required TBSI for the buffer status at the network side or at the UE side, and then, the first MCS or the second MCS may be selected (at step 213 or at step 223) based on the smaller TBSI.

In practice, the buffer status of the UE may be estimated by the network node based on a buffer status report received from the UE and data having been scheduled for transmission from the UE until receipt of the buffer status report.

As a non-limiting example, the first link adaptation loop may use the following equations:

$$TBSI_{mapped} = \lfloor 2 \cdot (CQI - 2) \rfloor, CQI > 1$$

$$TBSI_{adjusted\_eMBB} = \min(\max(\lfloor TBSI_{mapped} + TBSI_{adjusted\_eMBB} \rfloor, 0), 26)$$

where $$TBSI_{adjusted\_eMBB}(t+1) = TBSI_{adjusted\_eMBB}(t) + \left( (ACK_{eMBB} == 1) \cdot \frac{1}{\frac{1}{BLER_{tgt\_eMBB}} - 1} - (NACK_{eMBB} == 1) \right) \cdot$$

$$TBSI_{adjust\_step\_eMBB}$$

and, the second link adaptation loop may uses the following equations:

$$TBSI_{mapped} = \lfloor 2 \cdot (CQI - 2) \rfloor, CQI > 1$$

$$TBSI_{adjusted\_URLLC} = \min(\max(\lfloor TBSI_{mapped} + TBSI_{adjusted\_URLLC} \rfloor, 0), 26)$$

where $$TBSI_{adjusted\_URLLC}(t+1) = TBSI_{adjusted\_URLLC}(t) + \left( (ACK_{URLLC} == 1) \cdot \frac{1}{\frac{1}{BLER_{tgt\_URLLC}} - 1} - (NACK_{URLLC} == 1) \right) \cdot$$

$$TBSI_{adjust\_step\_URLLC}$$

wherein:

$TBSI_{mapped}$ is the first or second mapped TBSI determined based on the first or second CQI;

$TBSI_{adjusted\_eMBB}$ and $TBSI_{adjusted\_URLLC}$ are the first TBSI and the second TBSI finally determined by adjusting the first mapped TBSI and the second mapped TBSI, respectively;

$TBSI_{adjust\_eMBB}$ and $TBSI_{adjust\_URLLC}$ are adjustment variables for the first mapped TBSI and the second mapped TBSI, respectively, wherein:

$TBSI_{adjust\_eMBB}$ is decreased by a step $TBSI_{adjust\_step\_eMBB}$ upon receipt of NACK and increased by $TBSI_{adjust\_step\_eMBB}/(1/BLER_{tgt\_eMBB} - 1)$ upon receipt of ACK, wherein $BLER_{tgt\_eMBB}$ is the target BLER of the eMBB service; and $TBSI_{adjust\_URLLC}$ is decreased by a step $TBSI_{adjust\_step\_URLLC}$ upon receipt of NACK, and increased by $TBSI_{adjust\_step\_URLLC}/(1/BLER_{tgt\_URLLC} - 1)$ upon receipt of ACK, wherein $BLER_{tgt\_URLLC}$ is the target BLER of the URLLC service.

In another exemplary embodiment, for downlink transmission, the determination of the first or second TBSI may comprise: calculating a SINR based on a respective CQI; and determining an effective SINR by summing the calculated SINR and an adaptive offset; and determining a respective TBSI based on the effective SINR, wherein the adaptive offset is decreased by a first step in response to HARQ NACK, and increased by a second step in response to HARQ ACK, the first step and second step are selected based on respective target BLER.

In still another exemplary embodiment, for uplink transmission, the determination of the first or second TBSI may comprise: predicting a maximum achievable SINR by summing the SINR measured at the network node and a SINR adjustment variable; determining the TBSI based on the maximum achievable SINR, wherein the SINR adjustment variable is decreased by a step $SINR_{adjust\_step}$ in response to decoding failure, and increased by $SINR_{adjust\_step}/(1/BLER_{tgt} - 1)$ in response to decoding success, said $BLER_{tgt}$ is target block error rate (BLER) which is different for the first service having the first QoS requirement and the second service having the second QoS requirement.

In an exemplary embodiment, said obtaining of the transmission result may comprise distinguishing whether the HARQ feedback or the decoding result corresponds to the first service or the second service. As a non-limiting example, said distinguishing of the decoding result may be based on a logical channel identifier (ID) included in each transport block. Said distinguishing of the HARQ feedback may be based on a logical channel ID included in each transport block, and correspondence between each downlink transport block and its respective HARQ feedback. Said correspondence may be a Downlink Assignment Index (DAI) and a HARQ feedback bitmap when a common HARQ feedback channel is used.

The method of the present disclosure may further comprise configuring parameters for the first and second link adaptation loops via Operations, Administration and Maintenance (OAM) interfaces.

Figure 3:
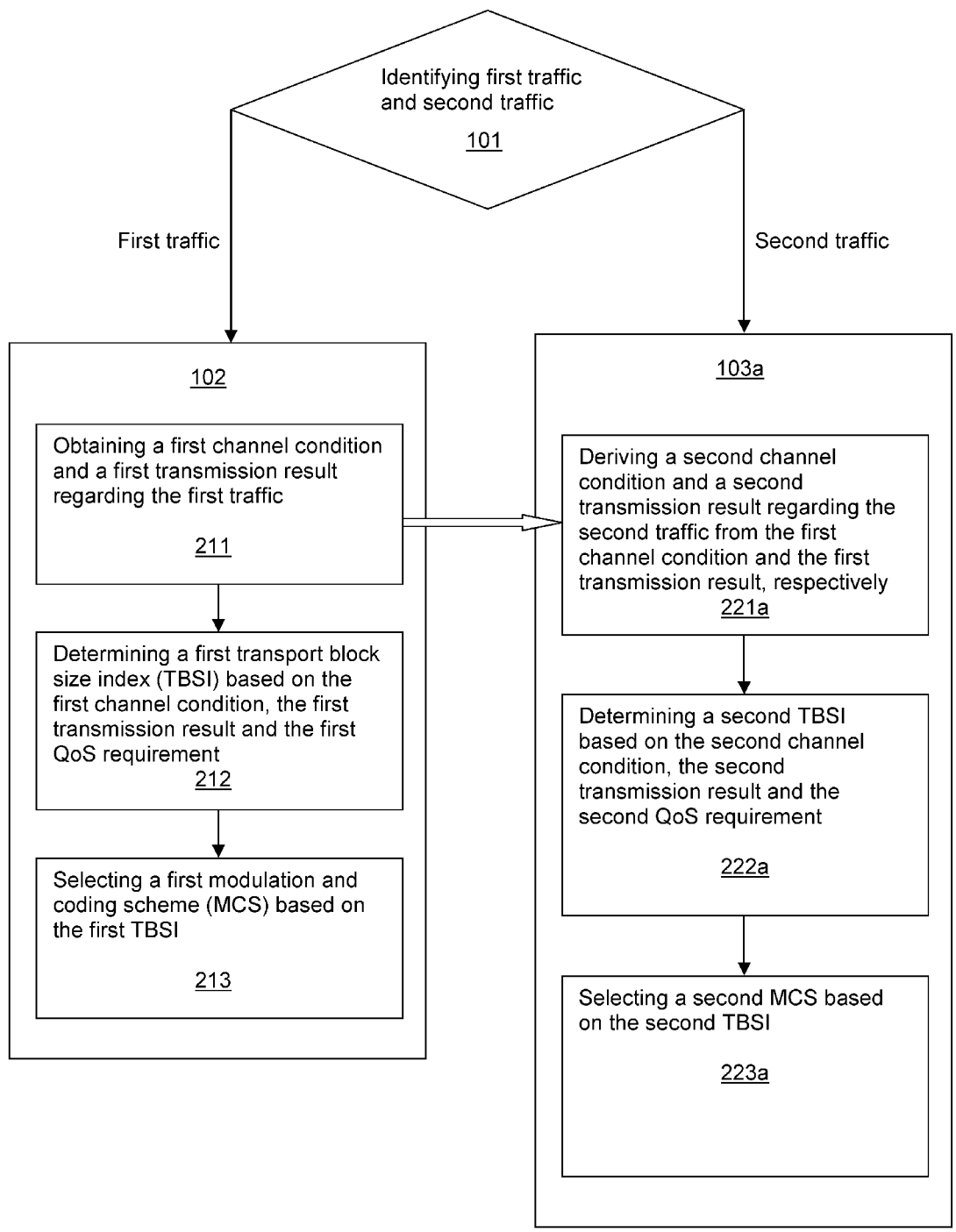
FIG. 3 is a flow diagram for illustrating a method for performing link adaptation according to another embodiment of the present disclosure.

FIG. 3 is a flow diagram for illustrating a method 300 for performing link adaptation according to another embodiment of the present disclosure.

The method 300 may comprise: identifying first traffic and second traffic at step 101; and applying a first link adaptation loop to the first traffic at step 102, and applying a second link adaptation loop to the second traffic at step 103a, wherein the steps 101, 102 and 103a of the method 300 may be similar as those steps of the method 100 as discussed above. According to the method 300, the second link adaptation loop may be configured to be dependent on the first link adaptation loop.

In an exemplary embodiment, said step 102 of applying the first link adaptation loop may comprise: obtaining a first channel condition and a first transmission result regarding the first traffic, at step 211; determining a first TBSI based on the first channel condition, the first transmission result and the first QoS requirement, at step 212; and selecting a first MCS based on the first TBSI, at step 213. In contrast to the step 103 of the method 200, said step 103a of applying the second link adaptation loop may comprise: deriving a second channel condition and a second transmission result regarding the second traffic from the first channel condition and the first transmission result, respectively, at step 221a; determining a second TBSI based on the second channel condition, the second transmission result and the second QoS requirement, at step 222a; and selecting a second MCS based on the second TBSI, at step 223a.

In an exemplary embodiment, a radio channel is shared by the first traffic and the second traffic. For example, the first traffic from eMBB service and the second traffic from URLLC service may be multiplexed on the same radio channel, so that the first traffic and second traffic may suffer from almost the same channel condition (e.g. fading and/or interference). Thus, the deriving of the second channel condition may comprise directly taking the first channel condition as said second channel condition.

In an exemplary embodiment, the deriving of the second transmission result may comprise proportionally converting the first transmission result into a hypothetical result as said second transmission result, according to ratio between the first QoS requirement and the second QoS requirement.

One potential issue with the above method 200 of FIG. 2 is that, as the target BLER for URLLC service is quite low, it will take quite long convergence time for the link adaptation loop for URLLC service. Sometimes, the method 200 may be not feasible if the URLLC traffic is much sparser than the eMBB traffic, because channel condition (e.g. fading and/or interference) may have already changed between two neighboring URLLC data block transmission, so that using the decoding result of previous transmission having occurred very early to adjust the TBSI of a current transmission may not be suitable. However, it is possible the eMBB traffic is constantly or frequently transmitted, the link adaptation loop for eMBB service has a short convergence time. When the radio channel is shared by eMBB and URLLC services, the channel condition may be almost the same for these two services. Hence, the channel condition for eMBB traffic may be regarded as the channel condition for URLLC traffic. Moreover, although the decoding result of eMBB traffic should not be used directly to adjust URLLC link adaptation loop, the decoding result of eMBB traffic can provide useful information about what the decoding result for URLLC traffic would look like.

Using the method 300 of FIG. 3, the channel condition and the transmission result regarding the URLLC traffic may be derived from the channel condition and the transmission result of the eMBB traffic. It is beneficial to run URLLC link adaptation loop based on eMBB link adaptation loop for the reasons discussed above. The method 300 is particularly advantageous in some circumstances, for example when the traffic pattern for URLLC is much sparser as compared with that of eMBB.

Moreover, using the method 300 of FIG. 3, the link adaptation loop of URLLC may be updated even when there is no URLLC traffic transmission but there is traffic transmission (either uplink or downlink) for eMBB. The difference between two loops is that, for each correct eMBB data transmission, eMBB link adaptation loop will increase its TBSI. As to URLLC link adaptation loop, its TBSI will be increased only when consecutive 'n' eMBB data blocks are received correctly. If any one of the n eMBB data blocks is NACKed, the TBSI is decreased. The parameter 'n' is related to the target BLER comparison between the URLLC service and the eMBB service. For instance, if the target BLER of URLLC is 1% and that of eMBB is 10%, then 'n' can be set as 10. That is, a hypothetical link adaptation for URLLC may be running in the absence of URLLC traffic if traffic transmission is ongoing for eMBB. That hypothetical outer loop may mimic what could happen for URLLC traffic according to the transmission results of eMBB traffic.

Figure 4:
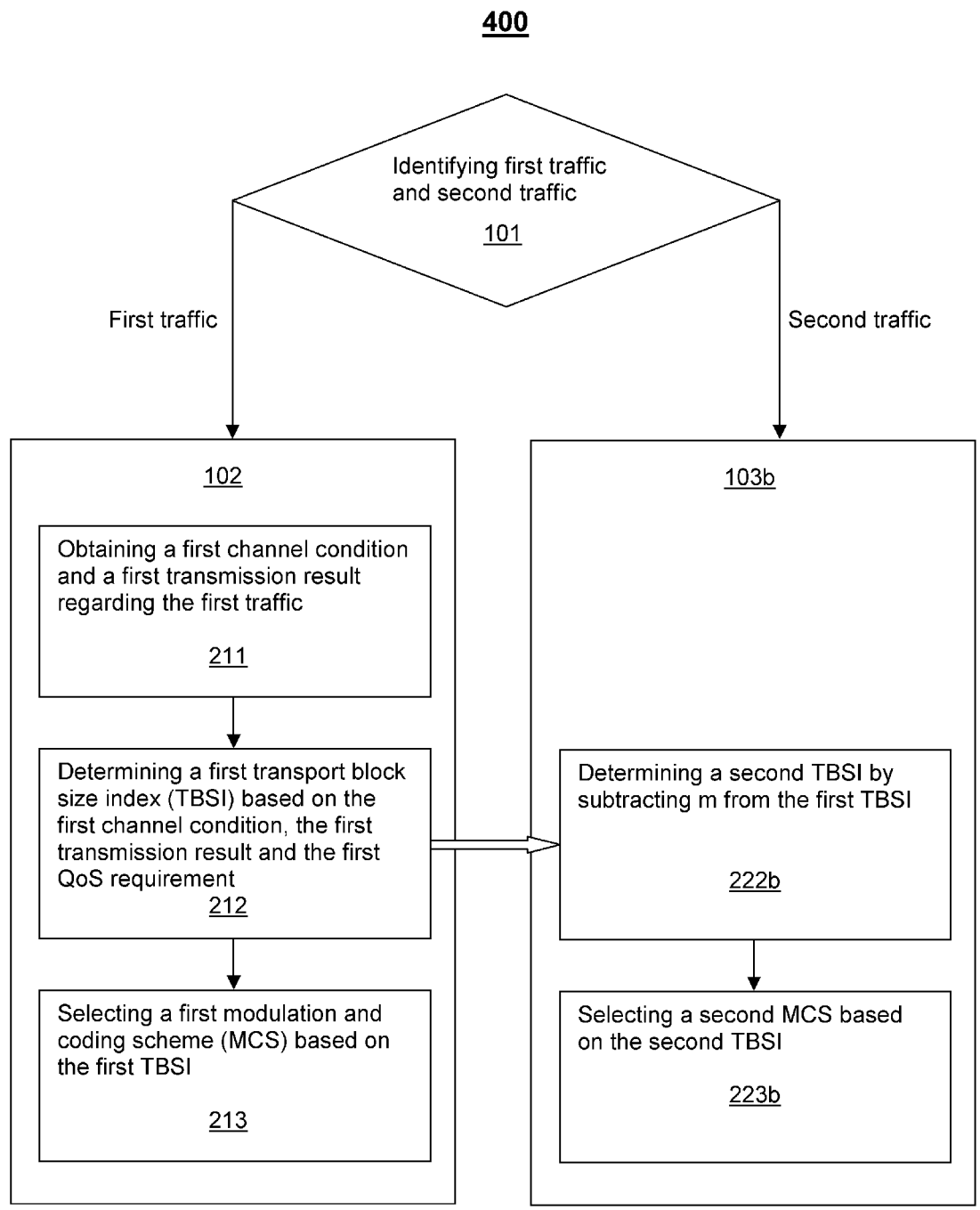
FIG. 4 is a flow diagram for illustrating a method for performing link adaptation according to still another embodiment of the present disclosure.

FIG. 4 is a flow diagram for illustrating a method 400 for performing link adaptation according to still another embodiment of the present disclosure.

The method 400 may comprise: identifying first traffic and second traffic at step 101; and applying a first link adaptation loop to the first traffic at step 102, and applying a second link adaptation loop to the second traffic at step 103b, wherein the steps 101, 102 and 103b of the method 400 may be similar as those steps of the method 100 as discussed above. According to the method 400, the second link adaptation loop may be configured to be dependent on the first link adaptation loop.

In an exemplary embodiment, said step 102 of applying the first link adaptation loop may comprise: obtaining a first channel condition and a first transmission result regarding the first traffic, at step 211; determining a first TBSI based on the first channel condition, the first transmission result and the first QoS requirement, at step 212; and selecting a first MCS based on the first TBSI, at step 213. In contrast to the step 103a of the method 300, said step 103b of applying the second link adaptation loop may comprise: determining a second TBSI by subtracting m from the first TBSI, at step 222b; and selecting a second MCS based on the second TBSI, at step 223b, wherein m is a positive integer obtained by estimation, measurement or simulation for the first and second services.

For example, in a simplified solution, the TBSI for URLLC traffic may be always set as the TBSI for eMBB traffic minus "m".

Figure 5:
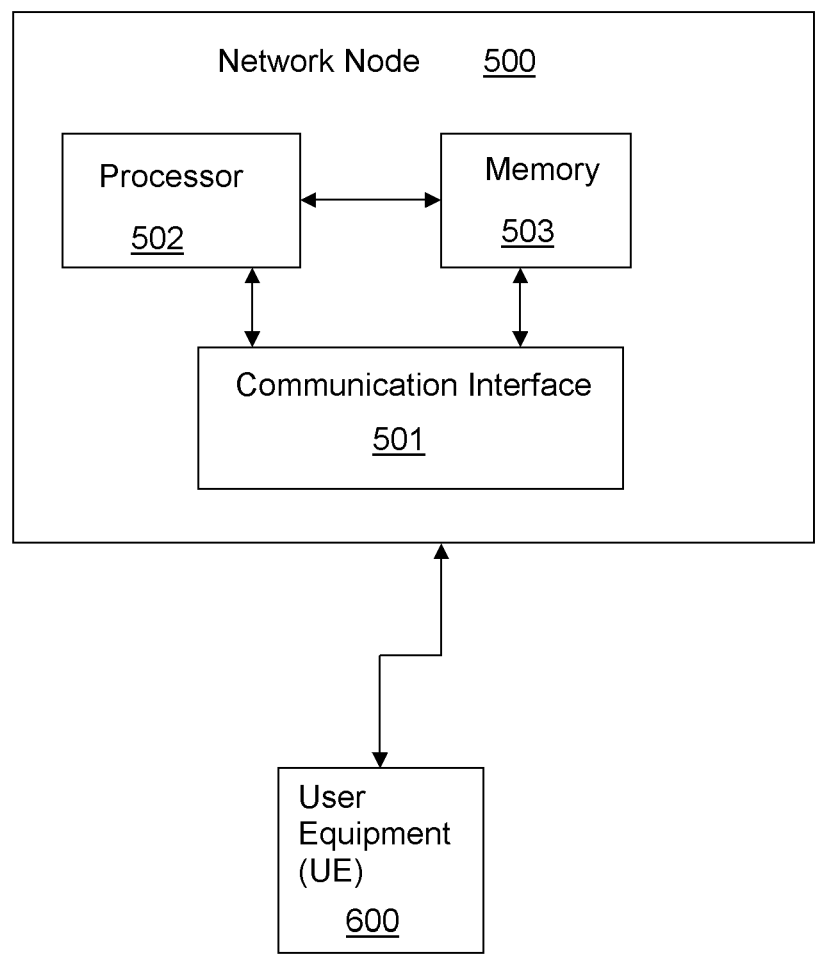
FIG. 5 is a block diagram for schematically illustrating a network node according to some embodiments of the present disclosure.

FIG. 5 is a block diagram for schematically illustrating a network node 500 according to some embodiments of the present disclosure.

The network node 500 may be one of: a radio base station, a node B (NB), an enhanced Node B (eNB), a New Radio (NR) base station (NR BS) or NR NodeB (gNB), and other wireless access point in a wireless communication network. In an exemplary embodiment, the wireless communication network may use a New Radio (NR) access technology. For example, the wireless communication network may be network 700 as shown in FIG. 6.

In one exemplary embodiment, the network node 500 in a wireless communication network may be configured for performing link adaptation for traffic included in transmission between the network node and a user equipment (UE). For example, any embodiment of the methods in the present disclosure can be implemented by the network node 500. The network node 500 may comprise a communication interface 501 and a processing circuitry. Said processing circuitry may be configured to enable the network node 500 to: identify first traffic and second traffic included in the transmission between the network node and the UE, wherein the first traffic is related to first service having a first QoS requirement, and the second traffic is related to second service having a second QoS requirement; and apply a first link adaptation loop catering for the first QoS requirement to the first traffic, and apply a second link adaptation loop catering for the second QoS requirement to the second traffic.

Said processing circuitry may be implemented by hardware component(s) and/or integrated circuit(s). Alternatively, said processing circuitry may comprise a memory and a processor, wherein the memory is configured to store computer program code being executable by the processor.

In another exemplary embodiment, the network node 500 may comprise a communication interface 501 configured to perform communication with a UE 600, a processor 502, and a memory 503. The memory 503 may contain instructions that when executed may cause the processor 502 to perform any embodiment of the methods in the present disclosure.

As a non-limiting example, said processor 502 may refer to a central processing unit (CPU), a microprocessor, a multi-core processor, a general-purpose processor, a dedicated-purpose processor or the like. Said memory 503 may refer to any machine readable storage medium (also called computer readable storage medium), such as magnetic disks, optical disks, read only memory (ROM), random access memory (RAM), flash memory devices, non-volatile memory, volatile memory or the like.

The term "UE" used herein may refer to any object enabled to communicate via a communication network, for example, a mobile telephone, a laptop with communication interface, personal digital assistants (PDA), computing device, vehicles having communication interface, or other devices such as meters, household appliances, medical appliances, multimedia devices and so on.

According to an exemplary embodiment, there is provided a computer program comprising computer program code which, when executed in a network node, causes the network node to perform any method as discussed in the present disclosure. As a non-limiting example, said computer program may be contained in a carrier, wherein the carrier is one of an electronic signal, optical signal, radio signal, and computer readable storage medium.

According to an exemplary embodiment, there is provided an apparatus for performing link adaptation in a wireless communication network. The apparatus may comprise function modules for performing each step in any embodiment of the methods of the present disclosure. Said function modules may be implemented by software, hardware, firmware, or any combination of them.

The embodiments in the present disclosure are not described with reference to any particular programming language. It will be appreciated that a variety of programming languages may be used to implement the teachings of the embodiments as described herein.

It is to be noted that, some embodiments have been presented in a form of flow diagram or block diagram. It will be appreciated that the orders of the steps and blocks as shown in these diagrams are only intended for illustrative purpose rather than for limitation of the present invention. Persons skilled in the art would recognize that some variations can be made to these diagrams without departing from the broader spirit and scope as claimed in the appended claims.

Throughout the description, the embodiments of the present disclosure have been described with reference to some specific details. It will be evident that various modifications may be made thereto without departing from the broader spirit and scope as claimed in the appended claims. Accordingly, the description and the drawings shall be interpreted in an illustrative sense rather than a restrictive sense.

What is claimed is:

1. A method for performing link adaptation at a network node in a wireless communication network, the method comprising:
   identifying first traffic and second traffic included in transmission between the network node and a user equipment (UE), the first traffic being related to first service having a first quality of service (QoS) requirement, and the second traffic is related to second service having a second QoS requirement;
   applying a first link adaptation loop catering for the first QoS requirement to the first traffic, applying a first link adaptation loop comprising:
      obtaining a first channel condition and a first transmission result regarding the first traffic;
      determining a first transport block size index (TBSI) based on the first channel condition, the first transmission result and the first QoS requirement; and
      selecting a first Modulation and Coding Scheme (MCS) based on the first TBSI; and
   applying a second link adaptation loop catering for the second QoS requirement to the second traffic, the second link adaptation loop independent from the first link adaptation loop, and applying a second link adaptation loop comprising:
      obtaining a second channel condition and a second transmission result regarding the second traffic;
      determining a second TBSI based on the second channel condition, the second transmission result and the second QoS requirement; and
      selecting a second MCS based on the second TBSI.

2. The method according to claim 1, wherein a radio channel is shared by the first traffic and the second traffic, and wherein the deriving of the second channel condition comprises directly taking the first channel condition as the second channel condition.

3. The method according to claim 1, wherein the second traffic is sparser than the first traffic, and wherein the deriving of the second transmission result comprises proportionally converting the first transmission result into a hypothetical result as the second transmission result, according to a ratio between the first QoS requirement and the second QoS requirement.

4. The method according to claim 1, wherein for downlink transmission, the channel condition comprises a channel quality indicator (CQI) reported by the UE, and the transmission result comprises Hybrid Automatic Repeat Request (HARQ) feedback from the UE; and
   for uplink transmission, the channel condition comprises a signal to interference noise ratio (SINR) measured at the network node, and the transmission result comprises decoding result at the network node; and
   wherein the QoS requirement comprises target block error rate (BLER).

5. The method according to claim 1, wherein the identifying of one of the first traffic and the second traffic comprises identifying respective traffic based on one of:
   a logical channel identifier (ID) included in each transport block for the respective traffic;
   a different length of transmission time interval (TTI); and
   numerology for the respective traffic.

6. The method according to claim 4, wherein the obtaining of the transmission result further comprises distinguishing whether one of the HARQ feedback and the decoding result corresponds to one of the first service and the second service.

7. The method according to claim 6, wherein the distinguishing is based on a logical channel identifier (ID) included in each transport block, and for the HARQ feedback, is further based on correspondence between each downlink transport block and its respective HARQ feedback.

8. The method according to claim 7, wherein the correspondence is a Downlink Assignment Index (DAI) and a HARQ feedback bitmap when a common HARQ feedback channel is used.

9. The method according to claim 4, wherein for downlink transmission the determining of the one of the first and the second TBSI comprises:
   mapping a respective CQI to a mapped TBSI; and
   adjusting the mapped TBSI based on a respective HARQ feedback and a respective target BLER to determine a respective TBSI.

10. The method according to claim 4, wherein for downlink transmission the determining of the one of the first and the second TBSI comprises:
    calculating a SINR based on a respective CQI;
    determining an effective SINR by summing the calculated SINR and an adaptive offset; and
    determining a respective TBSI based on the effective SINR,
    wherein the adaptive offset is decreased by a first step in response to HARQ NACK, and increased by a second step in response to HARQ ACK, the first step and second step are selected based on respective target BLER.

11. The method according to claim 4, wherein for uplink transmission the determining of the one of the first and the TBSI comprises:
    predicting a maximum achievable SINR by summing the SINR measured at the network node and a SINR adjustment variable; and
    determining the TBSI based on the maximum achievable SINR,
    wherein the SINR adjustment variable is decreased by a step $SINR_{adjust\_step}$ in response to decoding failure, and increased by $SINR_{adjust\_step}/(1/BLER_{tgt}-1)$ in response to decoding success, the $BLER_{tgt}$ is target block error rate (BLER) which is different for the first service having the first QoS requirement and the second service having the second QoS requirement.

12. The method according to claim 9, wherein the first service is enhanced Mobile Broadband (eMBB) service having target block error rate (BLER) of lower than 10%, and the second service is Ultra-Reliable and Low Latency Communications (URLLC) service having target BLER of lower than 1%.

13. The method according to claim 12, wherein:
    the first link adaptation loop uses the following equations:

$$TBSI_{mapped} = \lfloor 2 \cdot (CQI - 2) \rfloor, CQI > 1$$

$$TBSI_{adjusted\_eMBB} = \min(\max(\lfloor TBSI_{mapped} + TBSI_{adjusted\_eMBB} \rfloor, 0), 26)$$

where $$TBSI_{adjusted\_eMBB}(t+1) = TBSI_{adjusted\_eMBB}(t) +$$

$$\left( (ACK_{eMBB} == 1) \cdot \frac{1}{\frac{1}{BLER_{tgt\_eMBB}} - 1} - (NACK_{eMBB} == 1) \right) \cdot$$

$$TBSI_{adjust\_step\_eMBB}$$

the second link adaptation loop uses the following equations:

$$TBSI_{mapped} = \lfloor 2 \cdot (CQI - 2) \rfloor, CQI > 1$$

$$TBSI_{adjusted\_URLLC} = \min(\max(\lfloor TBSI_{mapped} + TBSI_{adjusted\_URLLC} \rfloor, 0), 26)$$

where $$TBSI_{adjusted\_URLLC}(t+1) = TBSI_{adjusted\_URLLC}(t) +$$

$$\left( (ACK_{URLLC} == 1) \cdot \frac{1}{\frac{1}{BLER_{tgt\_URLLC}} - 1} - (NACK_{URLLC} == 1) \right) \cdot$$

$$TBSI_{adjust\_step\_URLLC}$$

wherein:
   $TBSI_{mapped}$ is the first or second mapped TBSI determined based on the first or second CQI;
   $TBSI_{adjusted\_eMBB}$ and $TBSI_{adjusted\_URLLC}$ are the first TBSI and the second TBSI determined by adjusting the first mapped TBSI and the second mapped TBSI, respectively;
   $TBSI_{adjust\_eMBB}$ and $TBSI_{adjust\_URLLC}$ are adjustment variables for the first mapped TBSI and the second mapped TBSI, respectively, wherein:
   $TBSI_{adjust\_eMBB}$ is decreased by a step $TBSI_{adjust\_step\_eMBB}$ upon receipt of NACK and increased by $TBSI_{adjust\_step\_eMBB}(1/BLER_{tgt\_eMBB}-1)$ upon receipt of ACK, wherein $BLER_{tgt\_eMBB}$ is the target BLER of the eMBB service; and
   $TBSI_{adjust\_URLLC}$ is decreased by a step $TBSI_{adjust\_step\_URLLC}$ upon receipt of NACK, and increased by $TBSI_{adjust\_step\_URLLC}/(1/BLER_{tgt\_URLLC}-1)$ upon receipt of ACK, wherein $BLER_{tgt\_URLLC}$ is the target BLER of the URLLC service.

14. The method according to claim 1, wherein the selecting of the first MCS or the second MCS further comprises:
    selecting the MCS based on smaller TBSI determined by comparison between the determined one of the first and the second TBSI, and required TBSI for buffer status of the one of the network node and buffer status of the UE.

15. The method according to claim 14, wherein the buffer status of the UE is estimated by the network node based on a buffer status report received from the UE and data having been scheduled for transmission from the UE until receipt of the buffer status report.

16. The method according to claim 1, further comprising configuring parameters for the first and second link adaptation loops via Operations, Administration and Maintenance (OAM) interfaces.

17. A network node in a wireless communication network, comprising:
    a communication interface configured to perform communication with a user equipment (UE);
    a processor; and
    a memory, the memory containing instructions that when executed cause the processor to perform a method for performing link adaptation at a network node in a wireless communication network, the method comprising:
- identifying first traffic and second traffic included in transmission between the network node and the UE, the first traffic being related to first service having a first quality of service (QoS) requirement, and the second traffic is related to second service having a second QoS requirement;
- applying a first link adaptation loop catering for the first QoS requirement to the first traffic, applying a first link adaptation loop comprising:
  - obtaining a first channel condition and a first transmission result regarding the first traffic;
  - determining a first transport block size index (TBSI) based on the first channel condition, the first transmission result and the first QoS requirement; and
  - selecting a first Modulation and Coding Scheme (MCS) based on the first TBSI; and
- applying a second link adaptation loop catering for the second QoS requirement to the second traffic, the second link adaptation loop independent from the first link adaptation loop, and applying a second link adaptation loop comprising:
- obtaining a second channel condition and a second transmission result regarding the second traffic;
- determining a second TBSI based on the second channel condition, the second transmission result and the second QoS requirement; and
- selecting a second MCS based on the second TBSI.

18. A network node in a wireless communication network, configured for performing link adaptation for traffic included in transmission between the network node and a user equipment, the network node comprising:

- a communication interface; and
- a processing circuitry configured to cause the network node to:
  - identify first traffic and second traffic included in transmission between the network node and a user equipment (UE), the first traffic being related to first service having a first quality of service (QoS) requirement, and the second traffic is related to second service having a second QoS requirement; and
  - apply a first link adaptation loop catering for the first QoS requirement to the first traffic, applying a first link adaptation loop comprising:
    - obtaining a first channel condition and a first transmission result regarding the first traffic;
    - determining a first transport block size index (TBSI) based on the first channel condition, the first transmission result and the first QoS requirement; and
    - selecting a first Modulation and Coding Scheme (MCS) based on the first TBSI; and
  - apply a second link adaptation loop catering for the second QoS requirement to the second traffic, the second link adaptation loop independent from the first link adaptation loop, and applying a second link adaptation loop comprising:
    - obtaining a second channel condition and a second transmission result regarding the second traffic;
    - determining a second TBSI based on the second channel condition, the second transmission result and the second QoS requirement; and
    - selecting a second MCS based on the second TBSI.

19. The network node according to claim 18, wherein the network node is one of:
- a radio base station, a node B, an enhanced Node B, a New Radio base station or NR NodeB, and other wireless access point.

* * * * *